UNITED STATES PATENT OFFICE.

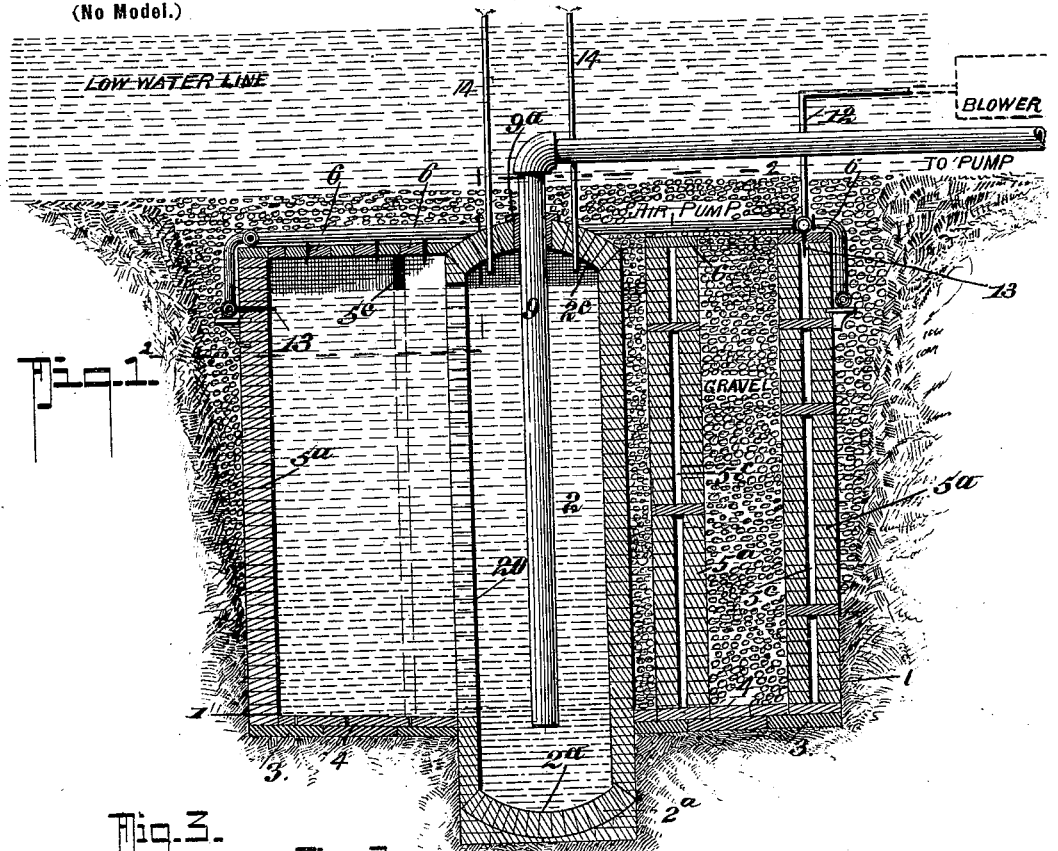
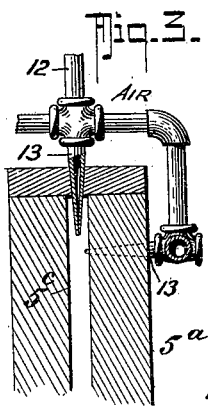
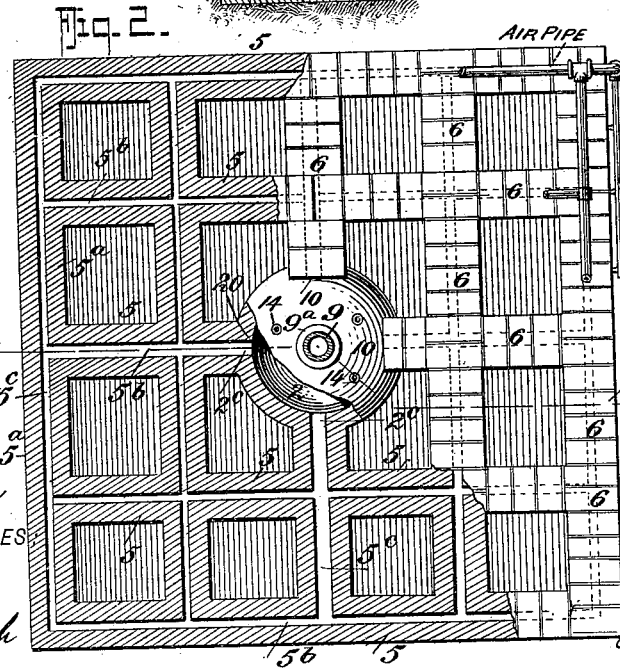
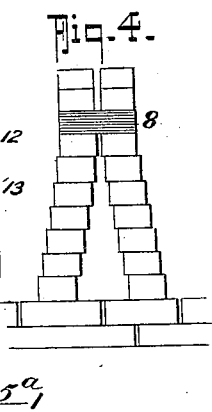

JAMES W. HAMMETT, OF EUREKA, WEST VIRGINIA.

FILTERING-INTAKE.

SPECIFICATION forming part of Letters Patent No. 623,782, dated April 25, 1899.

Application filed June 6, 1898. Serial No. 682,740. (No model.)

*To all whom it may concern:*

Be it known that I, JAMES W. HAMMETT, residing at Eureka, in the county of Pleasants and State of West Virginia, have invented a new and Improved Filtering-Intake, of which the following is a specification.

This invention, which relates generally to water-distributing means, more especially refers to improvements in the intake for city-supply waterworks of that kind which is placed in the bed of the stream and constantly held submerged.

Primarily my invention seeks to provide a combined filtering-intake and aerator means of a very simple, economical, and stable construction which can be easily built and which will effectively serve for its intended purposes.

This invention also comprehends such a construction of filtering-intake, in combination with aerating means, whereby a perfect and uniform filtration and a more thorough oxidation of the organic matters collected in the filtering-compartments are effected and the putrescible air caused to escape and prevented from being drawn off with the filtered water.

Another and essential feature of this invention lies in the correlation of the porous walls forming the main or water-pocket portions of the structure, the concentrated ways in which the water collects and which hold filtering-gravel, and the filtered-water-collecting compartment, whereby the same will be held substantially freed of muddy water or filth by reason of its being allowed to pass off with the current.

In its subordinate features this invention comprehends the peculiar combination and novel arrangement of parts, such as will be first described in detail and then be specifically pointed out in the appended claims, reference being had to the accompanying drawings, in which—

Figure 1 is a longitudinal section of my improved intake, taken practically on the line 1 1 of Fig. 2. Fig. 2 is a horizontal section of the same, partly in plan, the section portion being taken practically on the line 2 2 of Fig. 1. Fig. 3 is a detail view of one edge of one of the filtering-walls and illustrating the air-jet-pipe connections therewith. Fig. 4 illustrates one way of building the filtering-walls hereinafter more specifically referred to.

In its practical construction my improved intake is placed in the stream low enough to permit navigation over it. At a predetermined point within the stream is a suitable excavation (protected during the operation of building the intake by suitable dikes or coffer-dams) made to such depth as to be eight feet (more or less, as the character of the stream and the size of the intake may make necessary) below the low-water line of the supply. This excavation (indicated by 1 in the drawings) has its bottom dished toward the center to empty into a collecting-well 2, several feet deeper than the aforesaid bottom, such well being brick-lined, its bottom being in the nature of an inverted arch $2^a$, while its upper end extends to a point at or near the top of the vertical walls of the intake and terminates in an arch $2^c$, it being understood, however, that the size of the well will depend on the amount of water to be distributed and the size of the complete intake structure.

The dished bottom is covered by flat tiles or other vitreous blocks 3, of three feet square, more or less, to allow the joint thereof to come immediately under the vertical walls presently referred to. These tiles may have their joints cemented if the water from below is objectionable on account of lime or other impurities. Otherwise such joints may be left open.

Upon the tiled bottom is placed a subbottom 4 of bricks laid flatwise and having their abutting ends cemented, but being free of cement on the top and bottom to facilitate filtration and passing off of the water into the well or collecting-chamber 2, said bricks being, however, so laid on the tiled bottom 3 as to break joints therewith, whereby to reduce percolation of the water through the joints of the tiles to earth to a minimum.

On the tiled and bricked bottom is built the brickwork of the intake, which on account of simplicity of construction and economy may be laid off in squares in practice about three feet apart, the walls 5 $5^a$ joining at right angles, said walls extending up six feet, more or less. Each of the walls 5 $5^a$ is built up with the bricks laid flat and separated at the center, whereby to form collecting-spaces 5ᵇ 5ᶜ, in which the water gathers as it percolates through the walls 5 5ᵃ.

By reference to Fig. 2 it will be observed that the collecting-spaces of all the walls communicate, and the central ones of each series of walls connect with and drain into the well 2, the spaces 5ᵇ 5ᶜ of such central walls being of a greater transverse area than the other spaces to facilitate the draining of the filtered water to the well 2. The inner ends 20 of the center walls open into the center or collecting chamber, as clearly indicated in Figs. 1 and 2.

In building the intake the bricks of the walls 5 5ᵃ are carefully laid in hydraulic cement and the tops of the wall covered and closed by bricks laid crosswise, as indicated by 6. To increase the filtering action, the walls 5 5ᵃ may have their lower portions built by spacing the lowermost course of brick wide apart, as shown in Fig. 4, and gradually reducing the internal space by overlapping the brick courses and joining the uppermost course by binders 8, which are, however, spaced apart, so as not to break the continuity of the spaces 5 5ᵃ, and, if desired, the lowermost courses of the bricks constituting the vertical walls may be laid without cement joints.

So far as described, it will be readily seen that the intake comprises practically a series of water-pockets formed by the continuously-immersed bisecting walls and inclosed by an outer or surrounding wall, thereby providing a percolating action to all on all sides of each wall, the water passing through being collected and drained into the center well, with which the offtake-pipe 9 communicates and which passes through a water-tight joint 9ᵃ and extends upward a way and connects with a suitable pump. (Not shown.)

To purify the water and also increase the filtering action, especially so far as relates to causing a uniform drain toward the collecting-well, the aerating means are combined with the filtering-walls, arranged in such a manner that the full aerating effect of the air is obtained, and the air after it has accomplished its aerating function and imparted a sparkling appearance to the water by reason of the escape of a portion of its carbonic-acid gas is separated from the water and allowed to escape and not drawn off by the pump with the filtered and purified water. For this purpose air under pressure is fed from a blower or other compressor means, which may be operated by the same power operating the pump, into a line of pipe 12, which has suitable laterals extending either over the top of the intake or at the sides thereof (see, for example, Fig. 3) and provided with a series of jet-nozzles 13, which enter the spaces 5ᵇ 5ᶜ and permit the air to escape slowly and in fine streams to create a constant aeration and consequent purifying of the water, as also effecting a moderate air-pressure sufficient to cause the water collected within the spaces 5ᵇ 5ᶜ to seek the well 2, it being obvious that the air also passes off with the water in the well and collects under the dome or arch, from whence it escapes through one or more small offtake-pipes 14, which pass up above the normal water-line. Thus it will be seen that, while air is used for purifying, it after effecting such action passes off from the water and allows the purified water to be drawn up into the pipe 9, which is sufficiently extended down into the well to avoid danger of the air being drawn off into it. To further facilitate filtration, the spaces or pockets formed between the center walls are filled with gravel to a point about six inches above the walls, and the crevices between the walls and the excavation are also filled with gravel, the gravel bed being finished level with the bottom of the stream.

By constructing the intake as shown it is obvious that as the said intake is practically disposed at a point below the bed of the stream solids are permitted to float on past it, and whatever filth or sediment which might collect on the gravel top will as soon as it begins to ferment expand and rise and float away, as there are no projections or abutments against which it can lodge.

From the foregoing description, taken in connection with the drawings, it is thought the advantages and operation of my invention will be readily understood by those skilled in the art to which it appertains. The same can be economically constructed and is of such stable character as to admit of its being employed for the distribution of water for large or small cities, it being obvious that when intended for a very large distribution the intakes may be in series of batteries and the whole set made to drain to a collecting-well common to all, it being also understood that while this filterer and intake is more especially intended for large supplies the same principle may be adapted for use as a house or domestic filtering means.

Having thus described my invention, what I claim, and desire to secure by Letters Patent, is—

1. A combined filtering and purifying means for waterworks, comprising a series of water-holding compartments built of porous walls, said walls having communicating internal water-collecting spaces, a collecting-well common to all of such collecting-spaces, means for forcing air under pressure in fine jets into the aforesaid spaces, means for discharging the putrescible air from the collecting-well, and a lift or offtake pipe projected into such well, all being arranged substantially as shown and described.

2. As an improvement in water-distributing systems, an intake composed of a series of water-pockets, built of porous walls joined to form a single structure, said walls having internal collecting-spaces, a collecting-well common to all of the collecting-spaces, means for forcing air into the collecting-spaces, and means for exhausting the putrescible air, substantially as shown and described.

3. As an improvement in intakes for waterworks, a structure having a vitreous lined bottom, porous walls built up thereon, into regular compartments open at the top, a drain-well located centrally of all the compartments, the walls having each an internal water-collecting space discharging into each other and into the drain-well; an air-supply having jet-laterals discharging into the water-collecting spaces, the offtake-pipe 9, and the air-escape pipes 14, connected with the well, all being arranged substantially as shown and described.

4. The herein-described improvement in waterworks-intakes, comprising an intake structure having a vitreous bottom, a series of regularly-arranged bisecting walls of porous material built upon the said bottom, the inner ends of the central walls of the opposing series, being disconnected from each other and closed except at the lower end, an arch connecting the said inner ends of such central walls, and forming the top of a well projected below the vitreous bottom, all of the walls having internal collecting-spaces, and having their upper ends closed; an air-supply having laterals discharging into the internal spaces of the walls, an offtake-pipe extended down through the arch of the well and adapted to connect with a pump, and the air-offtakes extended into the upper end of the well and extended up above the normal high-water line, all being arranged substantially as shown and described.

5. As an improvement in water-distributing systems; an intake having its top at a point below the bottom of the stream, said intake being composed of a series of water-pockets having the porous walls joined to form a single structure, said walls having internal collecting-spaces; a collecting-well common to all of the collecting-spaces; the gravel bed covering the top of the intake and filling the water-pockets, whereby the bottom of the stream is made practically continuous over the intake, substantially as shown and for the purposes described.

JAMES W. HAMMETT.

Witnesses:
GEO. E. BOWERS,
S. S. MCGEE.